Oct. 3, 1939.  E. L. MACK ET AL  2,175,125

METHOD FOR FORMING FILMS AND FILM COATINGS

Filed June 15, 1937  3 Sheets-Sheet 1

INVENTOR
EDWARD L. MACK
EARLE H. MORSE
BY
John A. Bliss
ATTORNEY

Oct. 3, 1939.  E. L. MACK ET AL  2,175,125
METHOD FOR FORMING FILMS AND FILM COATINGS
Filed June 15, 1937    3 Sheets-Sheet 2

INVENTORS
EDWARD L. MACK
EARLE H. MORSE
BY
ATTORNEY

Oct. 3, 1939.  E. L. MACK ET AL  2,175,125
METHOD FOR FORMING FILMS AND FILM COATINGS
Filed June 15, 1937  3 Sheets-Sheet 3
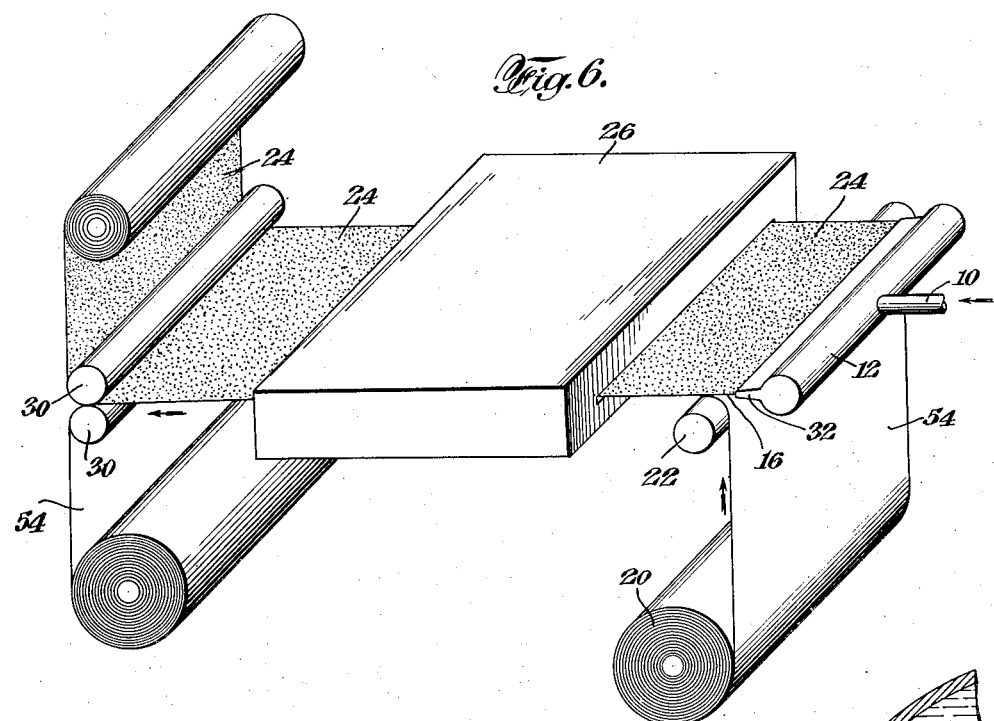
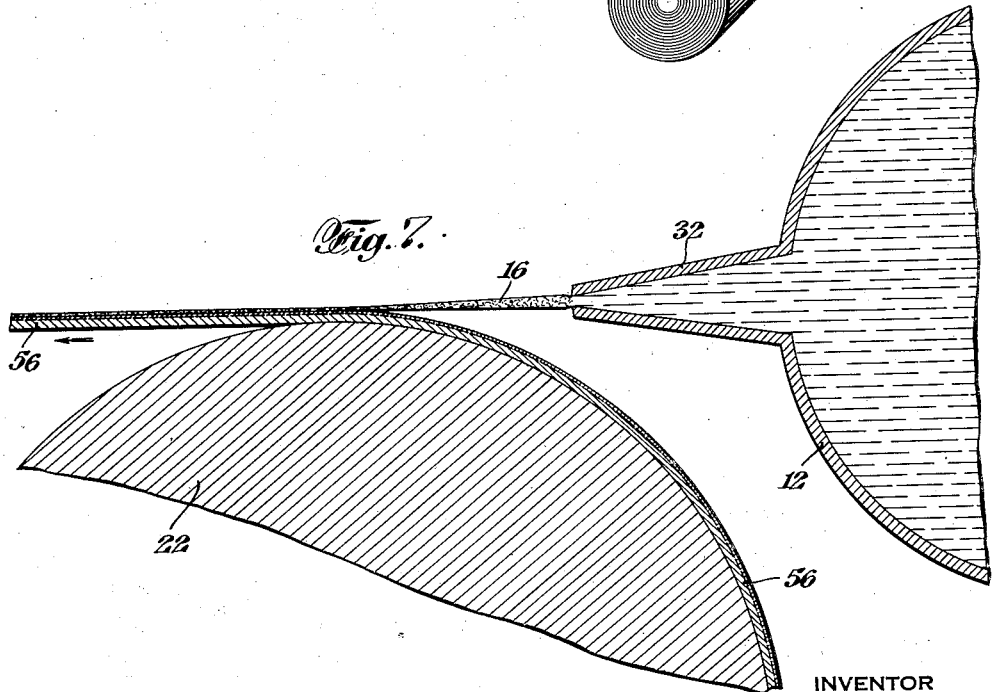
INVENTOR
EDWARD L. MACK
EARLE H. MORSE
BY
*John A. Blair*
ATTORNEY Patented Oct. 3, 1939

2,175,125

UNITED STATES PATENT OFFICE 2,175,125

METHOD FOR FORMING FILMS AND FILM COATINGS

Edward L. Mack, Douglaston, N. Y., and Earle H. Morse, Nutley, N. J., assignors to Reynolds Research Corporation, New York, N. Y., a corporation of Delaware Application June 15, 1937, Serial No. 148,382

18 Claims. (Cl. 91—68)

This application is a continuation in part of our application for United States Letters Patent Serial No. 78,976, filed May 11, 1936, and this invention primarily relates to processes and apparatus for the production of coatings of film-forming substances upon the surface of paper or other flexible sheet material, textile fabrics and the like, and may be adapted to forming films or coatings of cellulose derivatives of the type of cellulose nitrate and cellulose acetate, rubber derivatives of the type of chlorinated rubber and rubber hydrohalides, coatings of plastic coating materials particularly of the type such as plasticized rubber capable of being filmed which is normally solid but which softens upon heating, lacquers and the like, and, additionally, coatings or plain films of any substance capable of being dissolved to form a viscous solution with a volatile solvent and capable of forming a film upon the evaporation of the solvent and capable of being stretched while plastic, and the invention particularly relates to viscous filming solutions the viscosity of which is preferably above 600 centipoises.

Heretofore it has been customary to obtain coatings from filming solutions by applying a layer of the desired coating material dissolved in a volatile solvent to the surface of the paper or fabrics but relatively low viscosity solutions only were used. The application usually was by a transfer from the surface of a roll upon whose surface a film of the solution had been spread by partial immersion of the roll in a reservoir. A second method of application was by spraying. A third method was by applying an excess of the solution and scraping off such excess by a knife or so-called "doctor blade". All of these methods had the common disadvantage of causing the coating solution to penetrate the paper or the substance coated to some extent. The first two methods required solutions of such low viscosity as to make a large amount of penetration the rule. This is also true of merely brushing such solutions on the paper, fabric or substance coated, where the latter is absorbent. The third method permitted the use of same viscous solutions but the hydraulic pressure imposed upon the fluid film by the doctor blade tended to force the more viscous solutions into the pores of the paper; the third method was poorly adapted for applying thin films or for working upon thin or weak papers. Penetration of the paper or backing material also was encountered where the solution was rolled on if high roll pressure was used. Further, in all of these methods a considerable amount of coating solution was exposed to the atmosphere with consequent loss of volatile solvent and change in the composition of the solution. The knife method is poorly adapted to high speed coating and the spraying method often results in uneven application of the coating and in considerable mechanical losses of coating solution.

Where cellulose or rubber derivative film-forming substances have been dissolved in a volatile solvent and plain transparent film formed by casting on a polished metal drum, solutions of relatively low viscosities have been employed; solvent losses have been heavy; the drums which sometimes have a diameter as great as thirty feet are expensive installations and it is difficult to keep their casting surfaces in condition; also stripping the dried or partially dried films from the surfaces of the drums involves stripping difficulties which often lead to the breaking of the web.

Plasticized rubber is a good example of the class of plastic solids which are normally solid but which soften to a viscous fluid on heating. It has been difficult to cast or coat with materials of this type in many instances because of their high viscosity and often solvents have been added.

It is therefore an object of this invention to take advantage of the inherent physical characteristics of such film-forming materials or film-forming solutions, particularly such materials as have a viscosity of 600 centipoises or above and obtain therefrom a truly continuous and uniform film covering both fibers and voids of the backing substance at high speeds by continuous processes. Because highly viscous solutions may be employed, penetration of the backing substance is reduced to a minimum. Also highly volatile solvents may be employed leading to rapid drying and deodorizing.

It is a further object of this invention to permit the use of highly viscous filming solutions with the result that high ratios of solids to solvents are realized, resulting in obvious operating economies, particularly in solvent recovery.

It is still a further object of this invention not to expose the filming or coating solution to the atmosphere for any extended period prior to its being cast upon paper or other backing material. Therefore, to attain the above objects and such other advantages as will appear as the description of the invention proceeds, we have invented processes and apparatus the essence of which comprise means for extruding liquid filming solutions under pressure from a slit-like orifice disposed an appreciable distance from a backing material such as paper and deposition of a film upon the surface of the paper, which latter travels at a speed considerably greater than that at which the liquid film emerges from the orifice. Due to the tensile forces thus set up, the unsupported film between the orifice and paper is thus materially elongated or stretched and at the same time considerably reduced in thickness. After the film is deposited upon the backing substance it may be dried by subsequent passage through a drying chamber to evaporate the volatile solvents; or if the coating be of a thermoplastic type such as plasticized rubber, the coating can be cooled to solidify the same.

It is still a further object of this invention to cast high viscosity film-forming solutions by extrusion and stretching the same by a backing or sheet material to which the film is adherent while wet but to which the film tends to be non-adherent when dry, whereupon it is possible to obtain plain unbacked films.

The accompanying drawings illustrate diagrammatically ways in which the present invention may be practiced but it is to be expressly understood that the drawings are for purposes of illustration only and are not to be construed as limiting the invention or the apparatus which may be used therewith.

Fig. 6 is a perspective view of apparatus which may be used to form plain films, the backing or sheet material illustrated being aluminum foil; and Fig. 7 is a partial vertical section, greatly enlarged, of the pressure hopper orifice and a portion of the idler roller shown in Fig. 6, except that the backing material is composed of a layer of gelatin coated paper.

Figure 1:
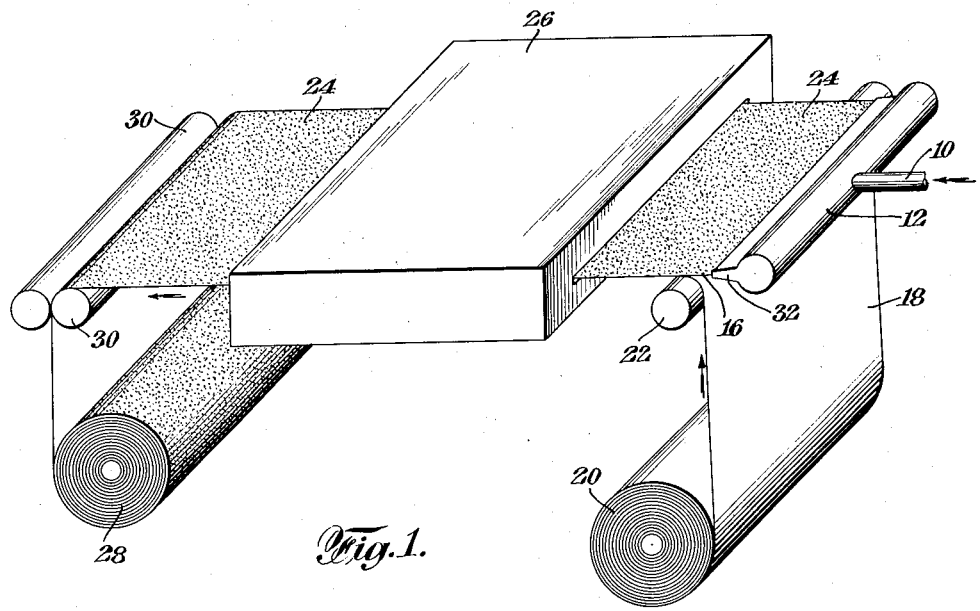
Fig. 1 is a perspective view of apparatus which may be used in the continuous formation of film coated paper where the filming substance is dissolved to a relatively high viscous solution in a volatile solvent and where such solution is extruded under pressure from a pressure hopper.
Figure 2:
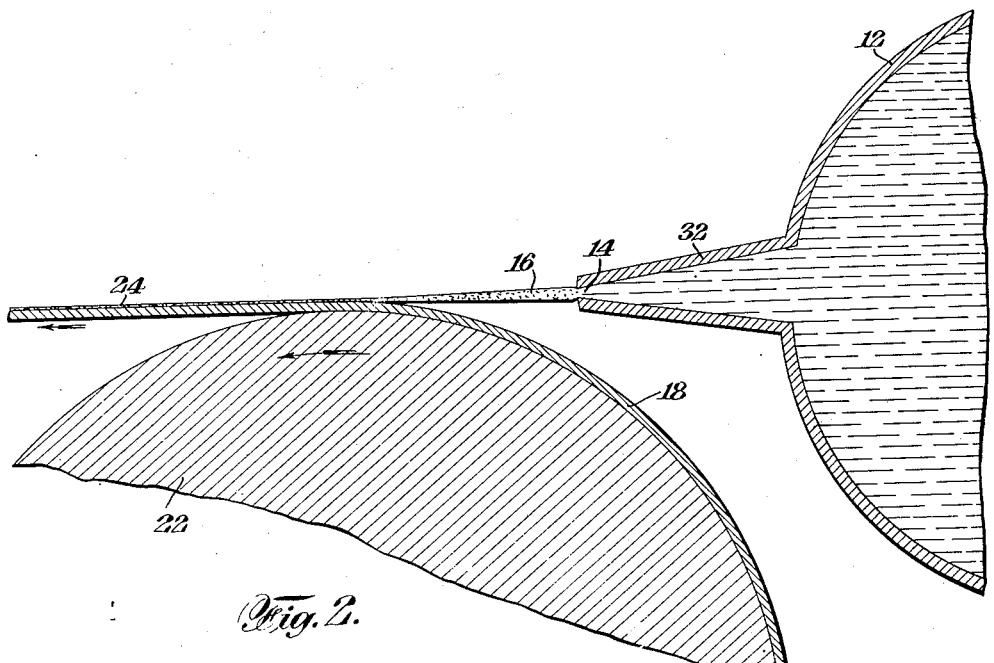
Fig. 2 is a partial vertical section, greatly enlarged, of the pressure hopper orifice and a portion of the idler roller shown in Fig. 1 indicating the stretching of the liquid film.

For the purposes of explaining one form of our invention the coating of paper with cellulose acetate will be taken as an example in conjunction with Figs. 1 and 2 of the drawings, but it is to be expressly understood that the invention is not restricted to the use of cellulose acetate as a coating material as the invention contemplates the use of any suitable coating material capable of being dissolved to a viscous solution in a volatile solvent and capable of forming a film upon the evaporation of the solvent, and particularly where the viscosity of the solution is above 600 centipoises. As an example of our invention a solution of cellulose acetate was prepared having the following composition (parts by weight): cellulose acetate 17.1, diethyl phthalate 5.7 and acetone 77.2. The solution was fed through conduit 10 into pressure hopper 12 where the same was extruded under a pressure of 4 lbs. per square inch, through knife-like orifice 14, which orifice was 13" x 0.03". As the liquid film, indicated as 16, first emerged from the orifice it tended to swell slightly due to release of pressure. A flexible strip of paper indicated as 18 was fed from paper roll 20 over idler roller 22. The paper 18 was about ¾" distant from orifice 14 of the pressure hopper 12. The solution was found to extrude from the pressure hopper at a rate of speed of approximately 3½ linear feet per minute and to have a viscosity, according to our calculations, of 13,200 centipoises. The linear speed of the paper was estimated as 50 feet per minute so that the paper may be said to have traveled approximately 15 times faster than the extruded liquid film. As the paper picked up the film there was a tendency to stretch the same from approximately .03" thickness to a thickness at the point of contact with the paper of approximately .002". Thereafter the film coated paper indicated as 24 was introduced into drying chamber 26 and subsequent thereto rolled upon roller 28. Pulling rollers indicated as 30 were used as a driving mechanism. After drying it was found that the film coating upon the paper had a thickness of .0004" and that there was a smooth uniform continuous film of cellulose acetate upon the paper having good adhesion but relatively no penetration.

It is obvious that the above is solely an example for the purpose of illustration inasmuch as the following variables are manifest in the process: (1) speed of paper; (2) viscosity of filming solution; (3) pressure upon filming solution; (4) width of the orifice opening of the pressure hopper; and (5) distance between the orifice of the hopper and the paper.

Wide latitudes insofar as these factors are concerned are permissible. Viscosities, generally speaking, may preferably range between 10,000–200,000 centipoises although this range naturally may be varied with pressures, size of the orifice opening, distance of the paper from the orifice opening, speed of the paper, as desired, to include filming operations of much higher and lower viscosities. It is advantageous to use high viscosity solutions because little penetration into the paper pores by the high viscosity solution will occur; however, films of much less than 10,000 centipoises and higher than 200,000 centipoises may be successfully used in our invention. Paper or backing material speeds of from 30–150 feet a minute are easily realizable and much higher paper speeds depending upon the other variables involved may be attained.

Generally the nozzle indicated as 32 of the pressure hopper will be inclined at an acute angle to the surface of the paper as this reduces air pockets and makes for uniformity of application and as illustrated in Fig. 2 the film is led preferably to the paper tangentially to the circumference of roller 22. Roller 22 may have a diameter of six inches.

It is obvious if the coating material is of the thermoplastic coating type such as plasticized rubber requiring no liquid vehicle that the material should be introduced into the pressure hopper 12 in heated form and if desired the pressure hopper 12 may have heating means associated therewith.

Figs. 3, 4, 5, 6 and 7 illustrate modified forms of apparatus suitable for practicing our inventions, and in these figures, also as in Figs. 1 and 2, like reference characters have been used to designate corresponding parts.

Figure 3:
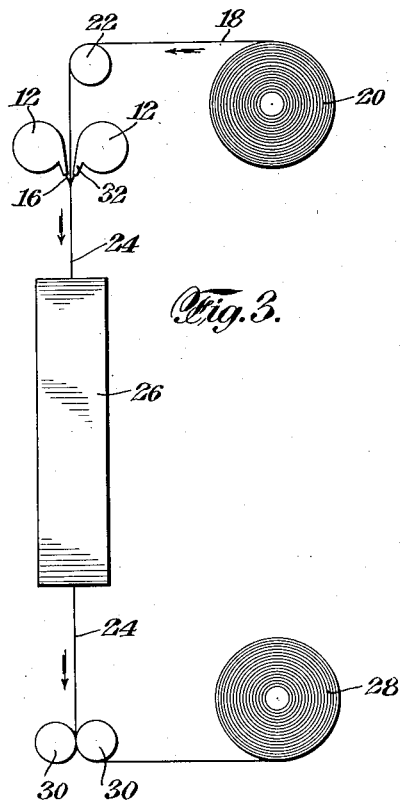
Fig. 3 is a semi-diagrammatic view of apparatus generally similar to that disclosed in Fig. 1 but which is adapted to coat simultaneously both sides of a base material such as paper.

Fig. 3 illustrates a generally similar apparatus as shown in Fig. 1 except that both sides of the base material, indicated as paper 18 are coated by the film 16 which may be extruded, as shown, from two pressure hoppers 12. It is preferable, when coating both sides of paper 18 to arrange the paper to move vertically while being coated.

Figure 4:
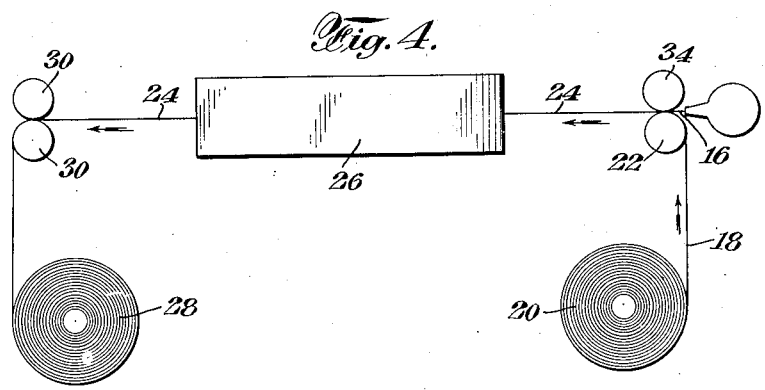
Fig. 4 is a semi-diagrammatic view of apparatus generally similar to that shown in Fig. 1 but including a roller mechanism designed to unite the base material and the film together under pressure.

Fig. 4 illustrates diagrammatically a similar apparatus as shown in Fig. 1 with the addition of a pressure roller 34 which latter cooperates with roller 22 to press the film 16 firmly against paper 18 and to unite the same. This form of apparatus may be used when exceedingly high viscosity filming solutions are employed, or where the nature of the backing material or film makes pressure uniting of the two desirable.

Figure 5:
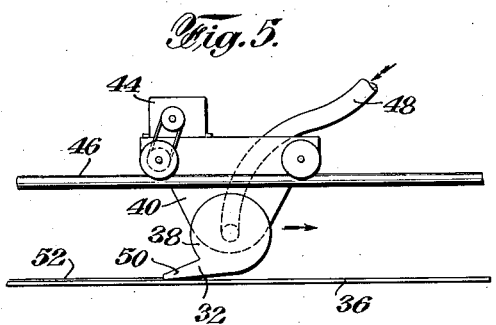
Fig. 5 is a semi-diagrammatic view of a modified form of apparatus upon which our invention may be used, wherein the base material is stationary and a pressure hopper provided with a tangential nozzle moves relative thereto at a predetermined rate of speed.

Fig. 5 illustrates an apparatus wherein the backing material, such as a fabric indicated as 36, is in stationary position. A pressure hopper 38 may be united by brackets 40 to frame 42, which latter is arranged to be driven horizontally by driving mechanism 44 upon support rail 46 at preferably uniform speeds. Filming solution is introduced through feed line 48 to pressure hopper 38 and extruded through nozzle 50 thereof, which latter may be tangentially arranged, as indicated. In this form of our invention, the film 52 is extruded considerably slower than the horizontal rate of speed of frame 42, so that substantial stretching of the film occurs.

Figs. 6 and 7 illustrate apparatus for continuously producing films of cellulose or rubber derivatives from film-forming substances dissolved in a volatile solvent in such quantity as to form a relatively high viscosity solution and this apparatus is substantially similar to that shown in Figs. 1 and 2. Elements similar to those in Figs. 1 and 2 have been given similar reference numerals. The high viscosity film-forming solutions, for example such as cellulose acetate solution of the character set out in connection with Figs. 1 and 2 and indicated as 16, are extruded from pressure hopper 12 and stretched by being applied to a faster moving base or sheet material 54. Base material 54, shown in Fig. 6, may be aluminum foil .003" thick and the film is adherent thereto when wet but relatively non-adherent when dry, and so can be stripped therefrom either as a part of the casting operation or later. Alternate base material 56 is shown in Fig. 7 and comprises gelatinized paper. Except for the base material to which the dried film tends to be relatively non-adherent and from which it can be stripped as indicated by the roll of plain unbacked film 58 illustrated in Fig. 6, the process for making plain film is precisely similar to the coating process described in connection with Figs. 1 and 2 and it will be understood that for a working example of making plain films the filming solution, pressure at the hopper, base material speed and apparatus indicated in respect to Figs. 6 and 7 is similar to that described in respect to Figs. 1 and 2; as will be understood by those skilled in the art, wide variations in suitable filming solutions, viscosities, extrusion speeds, backing material speeds, distance from the extrusion nozzle 32 to roller 22 and hopper pressures, are permissive.

Relatively non-adherent base materials upon which films may be cast are waxed paper, aluminum foil-faced paper, gelatin coated paper, gelatin coated cellulose derivatives of the type of cellulose acetate or cellulose nitrate, etc.

It has been found that the extrusion and "stretching" method for forming solutions or rubber derivative films described above gives a uniform film, permits important solvent savings and avoids the necessity for expensive, large casting drums for drying the film.

Various modifications and combinations of various features of the present invention as heretofore set out by illustrative examples will now occur to those skilled in the art from the drawings and description, and certain procedures described may be replaced by other procedures and certain features used without other features without departing from the spirit of the invention. Reference is therefore to be had to the claims for a definition of said invention.

Claims to the foregoing application of the film or sheet material to a moving base, where the same is stripped therefrom, are made the subject matter of a co-pending application Serial No. 159,038 filed Aug. 14, 1937, the present application containing generic claims for permanently coating any suitable base material.

We claim—

1. The method of coating base material with a plastic film-forming material which includes the steps of extruding the coating material in flat sheet form onto the base material through an orifice spaced from the base material but in proximity thereto and moving the base material and orifice apart at a speed greater than the coating material is extruded so that the sheet while still plastic, and prior to contact with the base material, is stretched while unsupported substantially to increase its length and decrease its thickness before coating the base material, and then coating the stretched sheet upon the base material.

2. The method of coating base material with a plastic film-forming material which includes the steps of extruding the film material in sheet form through an orifice entirely separated from the base material but in proximity thereto, uniting the sheet transversely of the base material, moving the base material and orifice apart at a speed greater than the coating material is extruded so that the extruded sheet while plastic but prior to contact with the base material while unsupported is stretched to increase its length and decrease its thickness substantially before coating upon the base material, and then coating the stretched sheet upon the base material.

3. The method of coating base material with a plastic film-forming material which includes the steps of extruding the coating material in sheet form from a film-forming solution of relatively high viscosity, directly stretching the extruded sheet while unsupported to increase its length and decrease its thickness substantially by contacting a transverse edge with the base material which is moved past the extrusion orifice at a much greater rate of speed than the linear rate of extrusion, and then coating the base material with the extruded stretched sheet.

4. The method as defined in claim 3 wherein the film or sheet-forming solution before extrusion has a viscosity of above 600 centipoises.

5. The method as defined in claim 3 wherein the film or sheet-forming solution before extrusion has a viscosity between 10,000–200,000 centipoises.

6. The method of coating paper with film-forming solutions comprising a volatile solvent and a cellulose derivative having a relatively high viscosity, which comprises extruding the solution in the form of an elongated sheet, increasing the length and decreasing the thickness of said elongated sheet while unsupported by tensile force applied thereto by the travel of the paper to be coated, coating said sheet upon paper, and evaporating the solvent.

7. The method as defined in claim 6 wherein said film-forming solutions before extrusion have a viscosity of over 600 centipoises.

8. The method as defined in claim 6 wherein said film-forming solutions before extrusion have a viscosity of over 10,000 centipoises.

9. The method of coating paper with film-forming solutions comprising a volatile solvent and a rubber derivative having a relatively high viscosity, which comprises extruding the solution in the form of an elongated sheet, relatively greatly increasing the length and relatively greatly decreasing the thickness of said elongated sheet while the same is unsupported by tensile force applied thereto by travel of the paper to be coated, coating said sheet upon paper at a point separated from the extrusion member, and evaporating the solvent.

10. The method of coating flat sheet fibrous material with a film forming solution comprising a volatile solvent and a cellulose derivative having a relatively high viscosity, which comprises extruding the solution at a predetermined rate of feed in the form of an elongated sheet, increasing the length and decreasing the thickness of said elongated sheet while unsupported by tension applied thereto by a moving band of said fibrous material which moves at a speed greater than the extrusion speed of the film, coating said elongated sheet upon said band of fibrous material, and evaporating the solvent.

11. The method of coating paper with a film-forming solution of cellulose acetate dissolved in acetone and having a viscosity of above 10,000 centipoises, which comprises extruding the cellulose acetate solution in the form of an elongated flat sheet from a pressure hopper, stretching the said elongated flat sheet while unsupported by tension applied thereto by picking up an end of the unsupported flat sheet with a faster moving band of paper whereby the length of the said flat sheet is greatly increased and its thickness greatly decreased, coating said elongated sheet upon the said band of paper, and evaporating the solvent.

12. The method of tangentially coating paper with a substance capable of being dissolved to a viscous solution in a volatile solvent and capable of forming a film upon the evaporation of the solvent which includes the steps of dissolving said substance to a relatively viscous solution in a volatile solvent, extruding the solution under pressure in the form of a liquid sheet, increasing the length and decreasing the thickness of said sheet while unsupported by stretching by tensile force applied thereto by the travel of the paper to be coated, coating the said paper therewith, and evaporating the solvent.

13. The method defined in claim 10 wherein said band of paper is led in an arcuate path and the extruded sheet is fed thereto tangentially to said roller.

14. The method of applying to moving flat sheet base material a film forming material which includes the steps of extruding the film forming material in continuous sheet form from the orifice of a pressure hopper spaced from the base material but in proximity thereto, thereafter directly stretching the sheet by tension applied thereto by picking up an end of the unsupported flat sheet with the moving base material which is arranged to move faster than the extruded sheet, whereby the length of the flat sheet is increased and its thickness decreased while unsupported, and then tangentially applying the extruded material while plastic, after stretching, to said base material, and then solidifying the film forming material.

15. The method of tangentially applying to flat sheet base material moving over a roll, a film forming material in solution form which includes the steps of extruding the film forming material in relatively thick liquid sheet form from the orifice of a pressure hopper in proximity to but removed from the moving base material, stretching the liquid sheet material to relatively thin form directly after its emission from the hopper by tension applied thereto while the body of the sheet is unsupported by pulling one end of the liquid sheet by means of the moving flat sheet material which latter is arranged to move in approximately the same direction of, but at a faster speed than, the liquid sheet, and then applying the stretched flat sheet while liquid to the moving base material substantially by means of the adhesive qualities of said stretched liquid sheet, and then drying the applied liquid sheet upon said flat sheet base material.

16. The method of tangentially coating flat sheet base material moving in an arcuate path with a film forming material in solution form which includes the steps of extruding the film forming material in a flat liquid sheet from the orifice of a pressure hopper in proximity to but slightly removed from the arcuate path of said base material, stretching the liquid sheet to relatively thin form directly after its emission from the hopper by tension applied thereto by pulling one end of the sheet while the same is unsupported by means of said flat sheet base material which is arranged to move faster than the speed at which the liquid sheet is extruded, tangentially coating said liquid sheet upon said base material by applying the same thereon through substantially adhesive qualities of the liquid sheet, and then drying the film forming liquid sheet.

17. The method of applying to moving flat sheet base material a film forming material which includes the steps of extruding the film forming material in continuous sheet form from the orifice of a pressure hopper spaced from the base material but in proximity thereto, thereafter directly stretching the sheet by tension applied thereto by picking up an end of the unsupported flat sheet with the moving base material which is arranged to move faster than the extruded sheet, whereby the length of the flat sheet is increased and its thickness decreased while unsupported and then applying the extruded material, while plastic, after stretching, to said base material and then solidifying the film forming material.

18. The method of applying to flat sheet base material moving over a roll, a film forming material in solution form which includes the steps of extruding the film forming material in relatively thick liquid sheet form from the orifice of a pressure hopper in proximity to but removed from the moving base material, stretching the liquid sheet material to relatively thin form directly after its emission from the hopper by tension applied thereto while the body of the sheet is unsupported by pulling one end of the liquid sheet by means of the moving flat sheet material which latter is arranged to move in approximately the same direction of, but at a faster speed than, the liquid sheet, and then applying the stretched flat sheet while liquid to the moving base material substantially by means of the adhesive qualities of said stretched liquid sheet, and then drying the applied liquid sheet upon said flat sheet base material.

EDWARD L. MACK.
EARLE H. MORSE.